United States Patent
Yoshimura et al.

(10) Patent No.: US 9,933,053 B2
(45) Date of Patent: Apr. 3, 2018

(54) BELT-TYPE CONTINUOUSLY VARIABLE TRANSMISSION FOR WORKING MACHINE

(71) Applicants: HONDA MOTOR CO., LTD., Tokyo (JP); Kabushiki Kaisha F.C.C., Hamamatsu-shi, Shizuoka (JP)

(72) Inventors: Hajime Yoshimura, Wako (JP); Yuji Matsuo, Wako (JP); Tomoaki Ishikawa, Wako (JP); Makoto Kataoka, Hamamatsu (JP); Shigeki Kawashima, Hamamatsu (JP); Norihiko Yokoyama, Hamamatsu (JP); Naoyuki Miwa, Hamamatsu (JP)

(73) Assignees: HONDA MOTOR CO., LTD, Tokyo (JP); KABUSHIKI KAISHA F.C.C., Hamamatsu-Shi (JP)

( * ) Notice: Subject to any disclaimer, the term of this patent is extended or adjusted under 35 U.S.C. 154(b) by 0 days.

(21) Appl. No.: 15/286,935

(22) Filed: Oct. 6, 2016

(65) Prior Publication Data

US 2017/0114875 A1 Apr. 27, 2017

(30) Foreign Application Priority Data

Oct. 23, 2015 (JP) ................................. 2015-208870

(51) Int. Cl.
*F16H 9/12* (2006.01)
*F16H 59/00* (2006.01)
(Continued)

(52) U.S. Cl.
CPC .............. *F16H 9/14* (2013.01); *E01H 5/098* (2013.01); *F16H 9/18* (2013.01); *F16H 55/56* (2013.01);
(Continued)

(58) Field of Classification Search
CPC .......... F16H 55/56; F16H 9/16; F16H 63/067; F16H 9/18; F16H 61/66272
(Continued)

(56) References Cited

U.S. PATENT DOCUMENTS 803,811 A * 11/1905 Cutter ..................... F16H 55/56
474/149
1,279,547 A * 9/1918 Hueber ................... F16H 55/56
180/366
(Continued)

FOREIGN PATENT DOCUMENTS

DE 196 44 030 A1 5/1998
EP 1 262 690 A2 12/2002
(Continued)

OTHER PUBLICATIONS

European Search Report dated May 11, 2017, 7 pages.

*Primary Examiner* — Henry Y Liu
(74) *Attorney, Agent, or Firm* — Rankin, Hill & Clark LLP

(57) ABSTRACT

A belt-type continuously variable transmission capable of continuously changing a speed reduction ratio of a driven pulley to a drive pulley, has a speed reduction ratio regulation mechanism that regulates a minimum speed reduction ratio of the driven pulley to the drive pulley. The driven pulley includes a fixed sheave, a movable sheave displaceable in an axial direction with respect to the fixed sheave, and a coil spring that urges the movable sheave toward the fixed sheave. The speed reduction ratio regulation mechanism has a swing arm that adjusts an allowable range in which moving away in an axial direction of the movable sheave with respect to the fixed sheave is possible, and a regulation drive section that drives the swing distal end portion of the swing arm to swing continuously.

12 Claims, 8 Drawing Sheets

(51) Int. Cl.
*F16H 61/00* (2006.01)
*F16H 63/00* (2006.01)
*F16H 9/14* (2006.01)
*E01H 5/09* (2006.01)
*F16H 61/662* (2006.01)
*F16H 63/06* (2006.01)
*F16H 9/18* (2006.01)
*F16H 55/56* (2006.01)
*F16H 7/08* (2006.01)

(52) U.S. Cl.
CPC ........... *F16H 61/662* (2013.01); *F16H 63/06* (2013.01); *F16H 63/062* (2013.01); *F16H 2007/0846* (2013.01); *F16H 2007/0868* (2013.01); *F16H 2061/66213* (2013.01)

(58) Field of Classification Search
USPC ..................................................... 474/37, 40
See application file for complete search history.

(56) References Cited

U.S. PATENT DOCUMENTS

| | | | | | |
|---|---|---|---|---|---|
| 1,350,670 | A | * | 8/1920 | Ritter | F16H 9/16 474/29 |
| 1,715,595 | A | * | 6/1929 | Gouldbourn | B30B 15/14 192/146 |
| 1,776,996 | A | * | 9/1930 | Crosby | F16H 55/566 451/294 |
| 2,097,559 | A | * | 11/1937 | Brownlee | F16H 7/0827 474/37 |
| 2,175,830 | A | * | 10/1939 | Davis | F16H 9/14 474/33 |
| 2,185,411 | A | * | 1/1940 | Lewellen | F16H 9/12 474/37 |
| 2,188,253 | A | * | 1/1940 | Reeves | F16H 9/16 474/37 |
| 2,297,936 | A | * | 10/1942 | Ballman | F16H 9/12 116/DIG. 4 |
| 2,298,535 | A | * | 10/1942 | Krag | F16H 9/16 474/37 |
| 2,478,870 | A | * | 8/1949 | Heyer | F16H 9/16 474/29 |
| 2,550,431 | A | * | 4/1951 | Shaw | F16G 5/18 474/242 |
| 2,582,067 | A | * | 1/1952 | Reeves | F16H 9/16 184/105.3 |
| 2,709,374 | A | * | 5/1955 | Williams | F16H 55/563 403/356 |
| 2,734,390 | A | * | 2/1956 | Thelander | F16H 55/56 474/37 |
| 2,740,246 | A | * | 4/1956 | Smith | A01D 34/6806 180/19.1 |
| 2,769,345 | A | * | 11/1956 | Bugenhagen | F16H 9/16 474/29 |
| 2,941,412 | A | * | 6/1960 | Wrobbel | F16H 9/14 474/25 |
| 2,996,934 | A | * | 8/1961 | White | B62D 11/105 474/1 |
| 3,083,801 | A | * | 4/1963 | Frohner | F16D 25/14 192/109 F |
| 3,085,445 | A | * | 4/1963 | Fields | D06F 37/36 474/19 |
| 3,108,484 | A | * | 10/1963 | Rabinow | F16H 55/56 474/37 |
| 3,145,584 | A | * | 8/1964 | Fairbank | F16H 9/12 474/1 |
| 3,191,704 | A | * | 6/1965 | Sheiton | B62D 11/105 180/425 |
| 3,245,274 | A | * | 4/1966 | Firth | F16H 9/16 474/146 |
| 3,245,275 | A | * | 4/1966 | Raso | F16H 9/16 474/37 |
| 3,250,141 | A | * | 5/1966 | Luenberger | F16H 9/16 474/37 |
| 3,342,079 | A | * | 9/1967 | Yoshigaki | A01B 63/10 474/19 |
| 3,705,517 | A | * | 12/1972 | Yamanaka | F16H 9/16 474/40 |
| 4,119,326 | A | * | 10/1978 | Porter | B62M 9/06 280/236 |
| 4,223,771 | A | * | 9/1980 | Petersen | F16D 67/02 192/224 |
| 4,364,735 | A | * | 12/1982 | Plamper | F16H 55/563 474/13 |
| 4,504,022 | A | * | 3/1985 | Stang | B65H 51/06 226/175 |
| 5,334,103 | A | * | 8/1994 | Gryspeerdt | F16H 55/56 474/171 |
| 5,643,116 | A | * | 7/1997 | Genzel | F16H 59/38 474/11 |
| 5,662,538 | A | * | 9/1997 | Wang | F16H 55/56 474/103 |
| 5,795,256 | A | * | 8/1998 | Takada | F16H 9/12 474/37 |
| 6,224,506 | B1 | * | 5/2001 | Peeters | F16H 7/0827 192/111.11 |
| 6,478,702 | B2 | * | 11/2002 | Borghi | F16H 63/067 192/3.54 |
| 6,561,935 | B2 | * | 5/2003 | Peeters | F16H 7/0827 474/37 |
| 6,755,759 | B2 | * | 6/2004 | Blanchard | F16H 9/18 474/19 |
| 7,418,841 | B2 | * | 9/2008 | Yoon | D06F 37/40 68/12.24 |
| 7,641,580 | B2 | * | 1/2010 | Blanchard | A01D 34/6806 180/333 |
| 7,699,728 | B2 | * | 4/2010 | Pritchett | F16H 63/067 474/13 |
| 8,393,985 | B2 | * | 3/2013 | Blanchard | F16H 55/56 474/19 |
| 2005/0239585 | A1 | * | 10/2005 | Nishida | F16H 55/56 474/19 |
| 2007/0026981 | A1 | * | 2/2007 | Blanchard | F16H 55/56 474/8 |
| 2010/0184543 | A1 | * | 7/2010 | Yamashita | F16H 63/062 474/11 |
| 2014/0332307 | A1 | * | 11/2014 | Larson | B60K 17/08 180/366 |
| 2015/0240919 | A1 | * | 8/2015 | Barendrecht | F16H 9/18 474/37 |

FOREIGN PATENT DOCUMENTS

| | | |
|---|---|---|
| EP | 2 784 357 A1 | 10/2014 |
| JP | H5-060192 | 3/1993 |
| JP | H5-40096 | 5/1993 |
| JP | 2009-079759 | 4/2009 |
| JP | 2013-170608 | 9/2013 |

\* cited by examiner

BELT-TYPE CONTINUOUSLY VARIABLE TRANSMISSION FOR WORKING MACHINE

INCORPORATION BY REFERENCE

The present application claims priority under 35 U.S.C. §119 to Japanese Patent Application No. 2015-208870 filed on Oct. 23, 2015. The content of the application is incorporated herein by reference in its entirety.

BACKGROUND OF THE INVENTION

Field of the Invention

The present invention relates to a technical improvement of a belt-type continuously variable transmission for a working machine.

Description of the Related Art

A belt-type continuously variable transmission for a working machine is a transmission capable of continuously changing a speed reduction ratio of a driven pulley to a drive pulley. In order to enhance the working efficiency of a working machine and the degree of freedom of work, it is preferable that a worker can optionally regulate the working speed of the working unit, and the traveling speed of the traveling unit, in accordance with a working situation.

As a working machine like this, an auger snowplow is cited, for example. A general auger snowplow can scrape up snow by the auger at a front part while traveling forward by a power source, and blow the snow which is scraped up to a distance via a chute by a blower. A load that is applied to the auger and the blower, that is, the load on the snow removal working unit successively changes due to various factors such as the density of snow, a snow removal height, and a snow throwing distance. In this relation, the art in which a belt-type continuously variable transmission is interposed in a working power transmission system from a drive source to a snow removal working unit is known from Japanese Utility Model Publication No. 05-040096, for example.

The belt-type continuously variable transmission known from Japanese Utility Model Publication No. 05-040096 is composed of a drive pulley that is provided at an output shaft of an engine, a driven pulley that is provided at a drive shaft of an auger and a blower, a V-belt that is laid between the drive pulley and the driven pulley, and a tension pulley that is located in the middle of the V-belt. The driven pulley is composed of a fixed sheave provided at the drive shaft, a movable sheave displaceable in an axial direction with respect to the fixed sheave, and a spring that urges the movable sheave to the fixed sheave. The tension pulley is driven by a hydraulic cylinder to advance and retreat with respect to the V-belt.

A worker optionally operates an operation unit in accordance with the quality of snow to be removed. A control device extends and contracts the piston of the hydraulic cylinder by performing drive control of a hydraulic pump in accordance with the operation signal of the operation unit. When the piston extends, and thereby the tension pulley presses the V-belt, the tension of the V-belt increases. In accordance with increase in tension, the movable sheave moves away in the axially longitudinal direction with respect to the fixed sheave. When the piston contracts, and thereby the pressing force to the V-belt by the tension pulley reduces, the tension of the V-belt decreases. In accordance with decrease in the tension, the movable sheave moves closer to the fixed sheave. In this manner, in accordance with the displacement amount of the movable sheave to the fixed sheave, an effective diameter of the driven pulley changes. As a result, the speed reduction ratio of the driven pulley to the drive pulley can be continuously changed.

The driven pulley of an ordinary belt-type continuously variable transmission is provided with a well-known torque cam mechanism. The torque cam mechanism converts a part of torque that is transmitted to the movable sheave from the V-belt into a thrust, and is known from Japanese Patent Laid-Open No. 05-060192, for example. It is preferable to also provide the torque cam mechanism in the belt-type continuously variable transmission which is known from Japanese Utility Model Publication No. 05-040096. A belt-type continuously variable transmission can smoothly perform a displacement operation of the movable sheave by including the torque cam mechanism.

However, in order to enhance snow removing workability in the case in which the snow throwing place where snow is thrown from an auger snowplow is narrow, and in the case in which snow removing work is performed in a densely built-up residential area, there is yet room for further improvement. That is, the load on the snow removal working unit can instantly increase and decrease due to various abrupt change factors such as the density of snow to be removed, and the snow removing height. When the load is abruptly decreased, a movable sheave temporarily moves away from a fixed sheave by the action of a torque cam mechanism accompanying the abrupt decreases. Consequently, the rotational speed of a blower can temporarily become a high speed. When the blower has a high speed, the snow throwing distance from the chute becomes long. Even in the case like this, in the densely built-up residential area, a careful operation is required so that thrown snow does not enter the grounds of adjacent houses.

In relation to this, the worker frequently needs to adjust the snow throwing direction and the snow throwing angle of the chute, and the operation is troublesome. In addition, the work is adjusting the snow throwing direction and the snow throwing angle frequently while moving the auger type snowplow forward, and therefore, a burden on the worker is large. In this way, in order to enhance the snow removing workability of the auger snowplow, there is yet room for further improvement. The same also applies to various working machines.

The present invention has an object to provide an art that can enhance workability of a working machine including a belt-type continuously variable transmission.

SUMMARY OF THE INVENTION

According to the present invention, a belt-type continuously variable transmission for a working machine is capable of continuously changing a speed reduction ratio of a driven pulley to a drive pulley. The driven pulley includes a fixed sheave, a movable sheave displaceable in an axial direction with respect to the fixed sheave, a coil spring that urges the movable sheave toward the fixed sheave, and a torque cam mechanism that converts a part of a rotational force that acts on the movable sheave into a thrust that presses a side surface of a V-belt. The belt-type continuously variable transmission for a working machine has a speed reduction ratio regulation mechanism that regulates a minimum speed reduction ratio of a rotational speed of the driven pulley to a rotational speed of the drive pulley. The speed reduction ratio regulation mechanism has a swing arm that adjusts an allowable range in which moving away in the axial direction of the movable sheave with respect to the fixed sheave is possible, and a regulation drive section that drives a swing distal end portion of the swing arm to swing continuously.

Consequently, for the movable sheave, the allowable range in which moving away in the axial direction with respect to the fixed sheave is possible is regulated by the swing arm. Accordingly, the movable sheave is displaceable only in the allowable range to a maximum move away position regulated by the swing arm from the position which is the closest to the fixed sheave. The swing arm can displace by swinging to be able to adjust the allowable range of the movable sheave. By regulating the allowable range of the movable sheave, that is, the maximum move away position, "the minimum speed reduction ratio" of the rotational speed of the driven pulley to the rotational speed of the drive pulley can be regulated.

In this manner, by adjusting the displacement amount of the swing arm, rotation in a high speed region of the driven pulley can be properly regulated. In only a range of a low speed region of the driven pulley, the movable sheave displaces to get close to and move away from the fixed sheave in accordance with increase and decrease of the load. As a result, rotation in the high-speed region of the working machine can be properly regulated in accordance with a working situation of the working machine.

When the load on the working unit is abruptly decreased, the movable sheave is to move away from the fixed sheave temporarily by the operation of the torque cam mechanism. That is, the rotational speed of the working unit is to be a high speed temporarily. In relation to this, in the present invention, rotation in the high speed region of the driven pulley can be regulated by the swing arm. Consequently, abrupt rotation in the high speed region of the driven pulley is regulated, and therefore, workability of the working machine including the belt-type continuously variable transmission can be enhanced more.

Further, according to the present invention, the swing arm extends in a direction to intersect a rotation center line of the driven pulley. A swing base end portion of the swing arm is supported by a bracket to be swingable in a direction along the rotation center line of the driven pulley. A region between the swing base end portion and the swing distal end portion in the swing arm is configured to be a pair of swing intermediate portions. The pair of swing intermediate portions are located by being separated at both sides radially outward of the coil spring, and are portions that adjust the allowable range in which moving away in the axial direction of the movable sheave with respect to the fixed sheave is possible.

In this way, the swing arm extends in the direction to intersect the rotation center line of the driven pulley, and is driven to swing by the regulation drive section. The pair of swing intermediate portions are located by being separated at both sides radially outward of the coil spring. Consequently, the degree of freedom of disposition of the swing arm and the regulation drive section is enhanced, and a space for disposition of the swing arm can be saved.

Furthermore, the regulation drive section drives the swing distal end portion in the swing arm. A distance from the swing base end portion to the swing distal end portion is longer than a distance from the swing base end portion to the swing intermediate portion. Consequently, by a relatively small drive force, the swing arm can be driven so as to regulate the maximum move away displacement of the movable sheave.

The swing arm is preferably located at an opposite side from the fixed sheave with respect to the movable sheave. Consequently, the regulation adjustment member can be disposed at the most suitable position to adjust the range in which the maximum move away displacement of the movable sheave with respect to the fixed sheave is possible.

The regulation drive section preferably includes an electric motor, a worm gear mechanism in which a worm is driven by the electric motor, and a drive force output portion that is driven by a worm wheel of the worm gear mechanism. Consequently, a reverse prevention function (self lock) can be given to the worm gear mechanism so as not to reverse the electric motor from the swing arm side. The reverse prevention function can more reliably regulate the swing arm so that the swing arm does not displace by a reaction force in the axial direction of the movable sheave. Furthermore, the swing distal end portion is connected to the drive force output portion by a connecting rod. Consequently, the regulation drive section can be disposed in a vacant space in the belt-type continuously variable transmission, and therefore, the degree of freedom of disposition can be more enhanced.

The belt-type continuously variable transmission for a working machine preferably further has a swing angle detection sensor that detects a swing angle of the swing arm. The swing angle detection sensor is connected to the swing distal end portion in the swing arm or a vicinity of the swing distal end portion, by a link mechanism. Consequently, the swing angle of the swing arm can be detected by the swing angle detection sensor via the link mechanism.

A swing displacement amount of the swing distal end portion, in the swing arm, is larger than a swing displacement amount of the other part. One end portion of the link mechanism is connected to the swing distal end portion with a large swing displacement amount or a vicinity of the swing distal end portion. Consequently, the swing angle of the swing arm can be accurately detected by the swing angle detection sensor. Furthermore, the link mechanism is included in the swing distal end portion far from the swing base end portion or a vicinity of the swing distal end portion, in the swing arm, and therefore, the degree of freedom of disposition of the swing angle detection sensor can be enhanced.

The belt-type continuously variable transmission for a working machine preferably has a roller bearing in a side portion that faces the pair of swing intermediate portions, in the movable sheave. An inner ring of the roller bearing is located concentrically with the rotation center line of the driven pulley, and is provided in the movable sheave. An outer ring of the roller bearing is covered with an annular cover rotatable with the outer ring. Either one of a side surface of the cover and side surfaces of the pair of swing intermediate portions, which face each other, has a protruded portion that is protruded toward the other one. The protruded portion is located to be able to press a side surface of the outer ring of the roller bearing via the cover when the pair of swing intermediate portions are displaced.

Consequently, the pair of swing intermediate portions indirectly contact the movable sheave under rotation via the roller bearing. Contact resistance of the pair of swing intermediate portions to the movable sheave under rotation can be reduced. In addition, when the pair of swing intermediate portions are displaced, the protruded portion presses the side surface of the outer ring of the roller bearing via the cover. As compared with a case where the displaced pair of swing intermediate portions press the side surface of the outer ring of the roller bearing via the cover, the contact resistance of the pair of swing intermediate portions to the movable sheave under rotation can be more reduced.

The belt-type continuously variable transmission for a working machine is preferably provided in a working power transmission system from a drive source to a working unit of the working machine. As the working unit in which the load always varies depending on the working situation, a blower of an auger snowplow, and a lawn mowing cutter of a lawn mower are cited, for example.

The "minimum speed reduction ratio" of the rotational speed of the driven pulley to the rotational speed of the drive pulley can be regulated. Accordingly, the movable sheave is displaceable only in the allowable range to the maximum move away position which is regulated by the swing arm from the position which is the closest to the fixed sheave, that is, only in a low speed region. In the low speed region, the speed reduction ratio of the rotational speed of the driven pulley to the rotational speed of the drive pulley can be automatically changed by the operations of the torque cam mechanism and the coil spring, in accordance with increase and decrease of the load on the working unit. Accordingly, the workability of the working machine including the belt-type continuously variable transmission can be more enhanced.

The present invention has the speed reduction ratio regulation mechanism which displaces so as to be able to adjust the allowable range in which moving away in the axial direction of the movable sheave with respect to the fixed sheave is possible. Consequently, the minimum speed reduction ratio of the rotational speed of the driven pulley to the rotational speed of the drive pulley can be regulated. Accordingly, the workability of the working machine including the belt-type continuously variable transmission can be enhanced more.

DETAILED DESCRIPTION OF THE PREFERRED EMBODIMENT

A mode for carrying out the present invention will be described hereinafter on the basis of the accompanying drawings.

Embodiment

A belt-type continuously variable transmission for a working machine according to an embodiment will be described on the basis of the drawings. A working machine loaded with the belt-type continuously variable transmission for the working machine is configured by a walking type auger snowplow, for example. Note that the working machine is not limited to a walking type auger snowplow. A "front", "rear", "left", "right", "top" and "down" are in accordance with a direction seen from a worker. Fr represents a front side, Rr represents a rear side, Le represents a left side, and Ri represents a right side.

Figure 1:
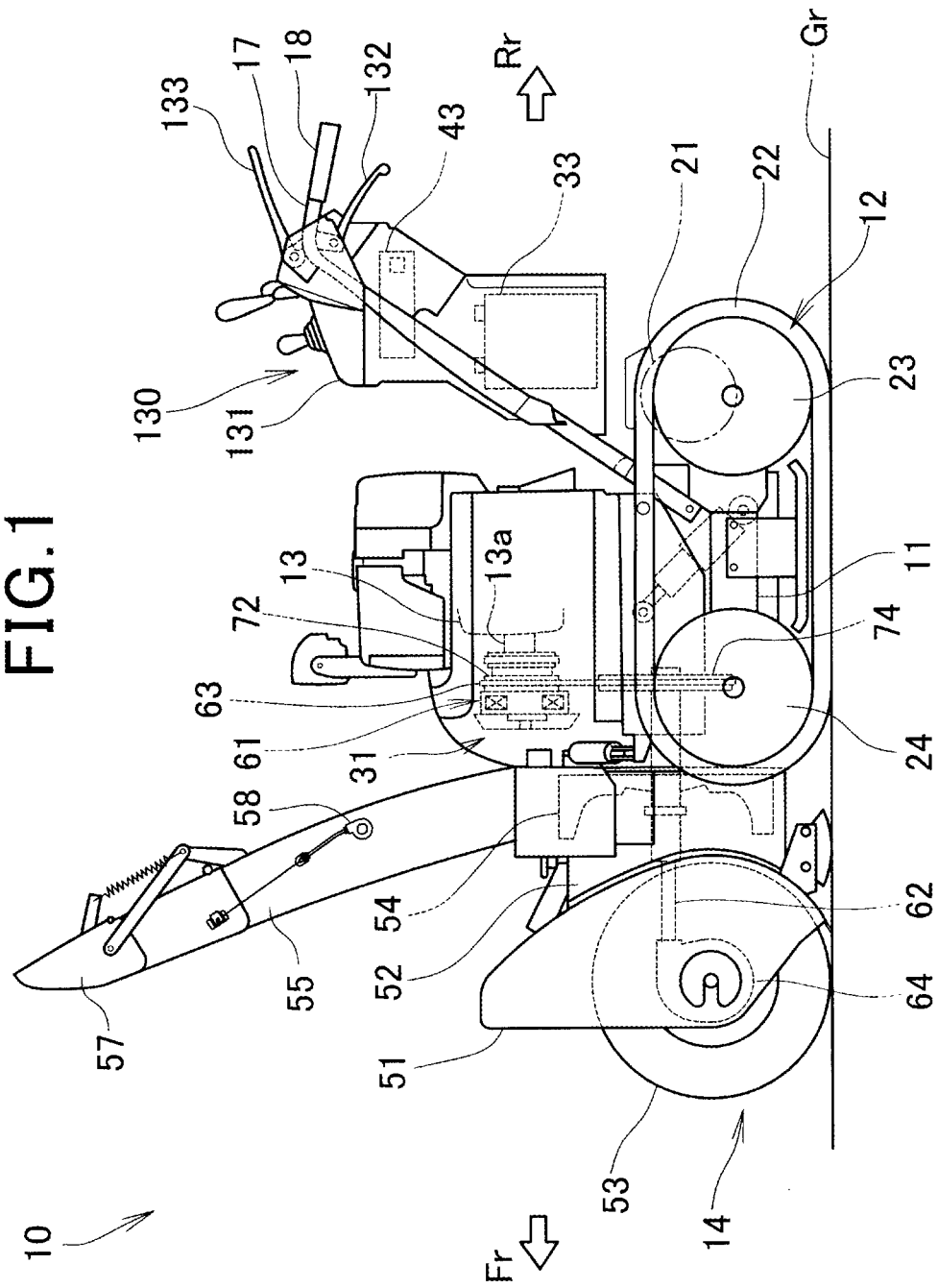
FIG. 1 is a side view of a working machine loaded with a belt-type continuously variable transmission for a working machine according to the present invention.

As shown in FIG. 1, a working machine 10 is a self-propelled auger snowplow (also referred to as a rotary snowplow) including a track frame 11 configuring a machine body of the entire working machine 10, a left and right traveling devices 12 equipped at the track frame 11, a drive source 13 and a working unit 14 which are integrally attached to the track frame 11.

At a rear part of the track frame 11, a left and right operation handles 17 that extend to an upper rear side are integrally attached. A left and right grips 18 are attached to distal ends of the left and right operation handles 17. A worker can steer the working machine 10 by the operation handles 17 while walking with the working machine 10.

The left and right traveling devices 12 are crawler type traveling devices which are composed of a left and right electric motors 21, a left and right crawler belts 22, a left and right drive wheels 23 disposed at a rear part, and a left and right rolling wheels 24 which are disposed at a front part. By drive forces of the left and right electric motors 21, the left and right crawler belts 22 can be driven via the left and right drive wheels 23.

Figure 2:
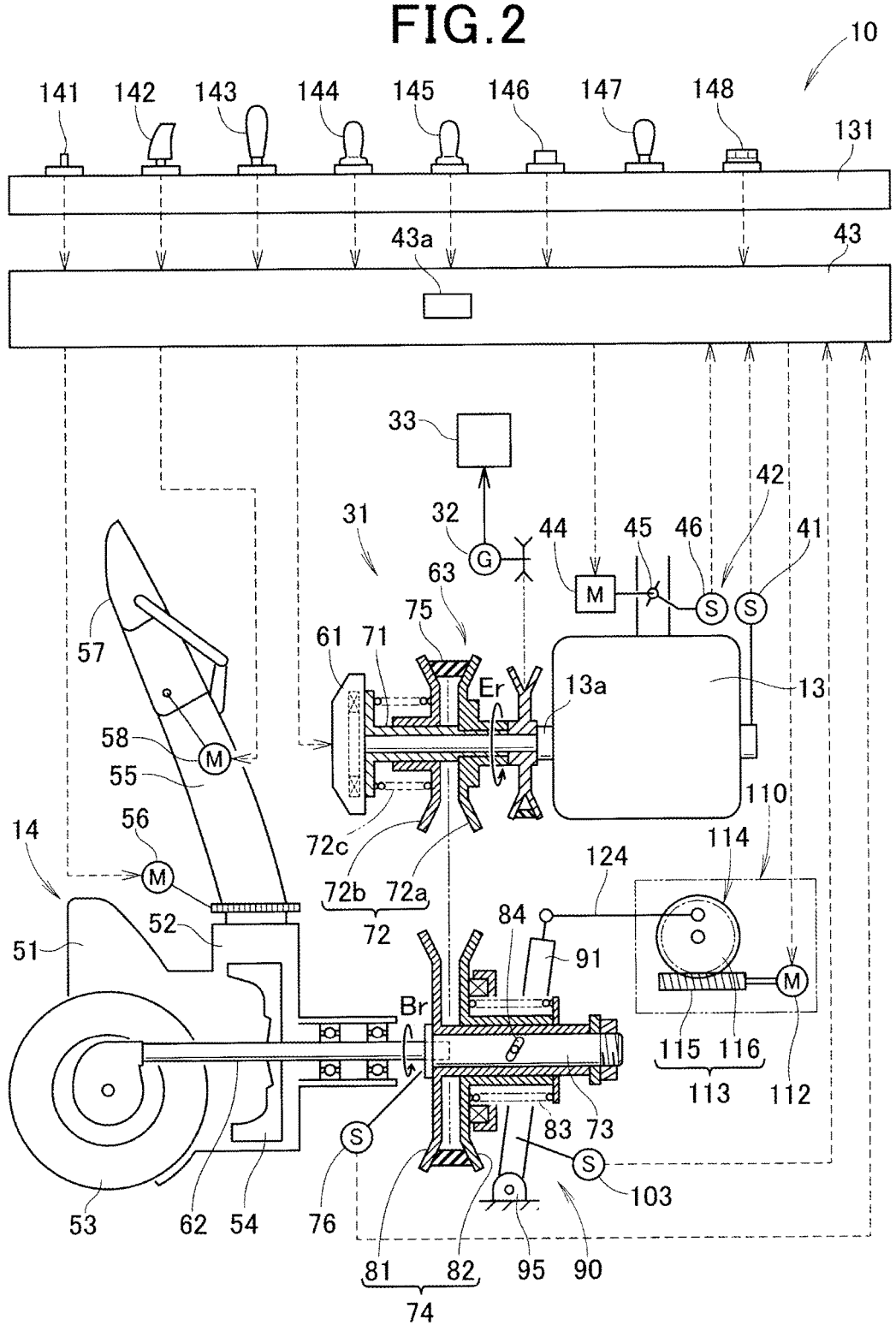
FIG. 2 is a schematic diagram of a drive source, a working unit and a working power transmission system shown in FIG. 1.

As shown in FIGS. 1 and 2, the drive source 13 is configured by an engine, for example. Hereinafter, the drive source 13 will be properly reworded as the "engine 13". The engine 13 drives the working unit 14 via a working power transmission system 31 and rotates a generator 32, supplies obtained electric power to a battery 33, and supplies the electric power to the left and right electric motors 21 and other electric and electronic parts. The left and right electric motors 21 are driven by the electric power generated by the generator 32 and the electric power of the battery 33.

As shown in FIG. 2, a rotational speed Er of the engine 13 is detected by an engine speed sensor 41 (a drive source speed sensor 41). The engine 13 is controlled by an electronic governor 42. The electronic governor 42 (also referred to as the electric governor 42) controls a control motor 44 by a control signal of a control unit 43, and thereby performs opening and closing control of a throttle valve 45 by the control motor 44. An opening degree of the throttle valve 45 is detected by an opening degree sensor 46.

A control system of the working machine 10 is concentrated around the control unit 43. The control unit 43 contains a memory 43a, and is configured to read various kinds of information stored in the memory 43a properly and perform control.

The working unit 14 is composed of an auger housing 51, a blower case 52 which is integrally provided on a rear surface of the auger housing 51, an auger 53 included in the auger housing 51, a blower 54 included in the blower case 52, and a chute 55 that is extended upward from an upper portion of the blower case 52.

The chute 55 is a so-called a snow throwing section at a time of blowing snow which is scraped up by the auger 53 to a location apart from the snowplow 10 by the blower 54. A base end portion of the chute 55 is rotatably attached to the blower case 52 substantially horizontally so as to adjust a snow throwing direction, that is, a compass direction in which snow is thrown. Consequently, the chute 55 is rotatable substantially parallel to a ground contact surface Gr (refer to FIG. 1) with which the traveling devices 12 (refer to FIG. 1) contact the ground. The chute 55 is driven by a chute drive motor 56.

A chute guide 57 is provided at an upper end portion of the chute 55. The chute guide 57 is attached to the upper end portion of the chute 55 to be swingable up and down so as to adjust a snow throwing angle in a vertical direction. The chute guide 57 is driven to swing by a guide drive motor 58.

As shown in FIG. 1, the working machine 10 (the snow-plow 10) scrapes up snow by the auger 53 at a front part while traveling forward by the left and right traveling devices 12, and can blow the scraped snow to a distance via the chute 55 by the blower 54.

As shown in FIG. 2, the working power transmission system 31 from the drive source 13 to the working unit 14 is composed of an electromagnetic clutch 61 which is connected to an output shaft 13a of the drive source 13, a rotating shaft 62 connected to the auger 53 and the blower 54, and a belt-type continuously variable transmission 63 for a working machine, which is interposed between the electromagnetic clutch 61 and the rotating shaft 62.

The belt type continuously variable transmission 63 for a working machine (hereinafter, referred to as the "belt type continuously variable transmission 63") includes a drive pulley 72 that is connected to a drive shaft 71, a driven pulley 74 that is connected to the driven shaft 73, and a V-belt 75 that is laid between the drive pulley 72 and the driven pulley 74, and can continuously change a speed reduction ratio of the driven pulley 74 to the drive pulley 72.

The drive shaft 71 is connected to the electromagnetic clutch 61. When the electromagnetic clutch 61 is in a disconnected (off) state, the drive shaft 71 is released with respect to the output shaft 13a of the drive source 13. When the electromagnetic clutch 61 is in a connected (on) state, the drive shaft 71 is connected to the output shaft 13a of the drive source 13.

The drive pulley 72 includes a fixed sheave 72a that is attached to the drive shaft 71, a movable sheave 72b that is capable of displacing in the axial direction with respect to the fixed sheave 72a, and a coil spring 72c (a drive side coil spring 72c) that urges the movable sheave 72b to the fixed sheave 72a. The movable sheave 72b is supported by the drive shaft 71 to be relatively rotatable with respect to the fixed sheave 72a, and is displaceable in the axial direction of the drive shaft 71 with respect to the fixed sheave 72a. A rotational speed of the drive shaft 71 and the drive pulley 72 is the same as the rotational speed Er of the engine 13.

The driven shaft 73 is located on the same axis as that of the rotating shaft 62, and is connected to one end of the rotating shaft 62. The working unit 14 is connected to the driven shaft 73 via the rotating shaft 62. That is, the auger 53 is connected to the rotating shaft 62 via a worm gear type speed reduction mechanism 64. The blower 54 is connected to the rotating shaft 62. A working rotational speed of the working unit 14 (in particular, the blower 54) is the same as a rotational speed Br of the driven shaft 73. The rotational speed Br of the driven shaft 73 is detected by a working unit speed sensor 76. Consequently, the working rotational speed Br of the working unit 14, that is, the working rotational speed Br of the blower 54 is practically detected by the working unit speed sensor 76.

Figure 3:
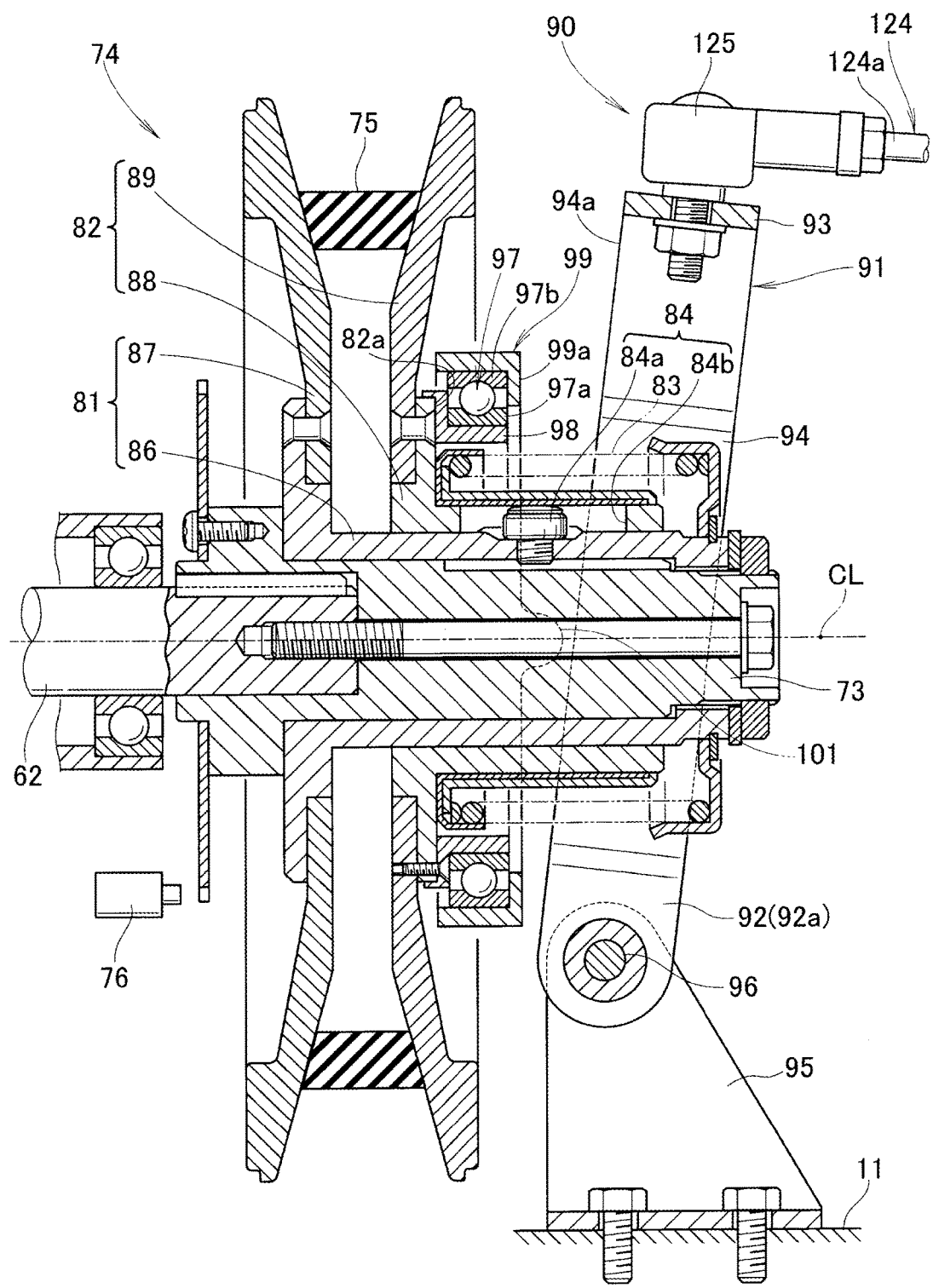
FIG. 3 is a sectional view of a driven pulley and a speed reduction ratio regulation mechanism shown in FIG. 2.

As shown in FIG. 3, the driven pulley 74 includes a fixed sheave 81 which is attached to the driven shaft 73, a movable sheave 82 that is displaceable in an axial direction with respect to the fixed sheave 81, a coil spring 83 (a driven side coil spring 83) that urges the movable sheave 82 to the fixed sheave 81, and a torque cam mechanism 84 that converts a part of a rotational force that acts on the movable sheave 82 into a thrust that presses a side surface of the V-belt 75.

Describing in detail, the fixed sheave 81 is composed of a tubular fixed side boss section 86 which is supported by the driven shaft 73, and a substantially disk-shaped fixed side sheave disk 87 provided at the fixed side boss section 86. The fixed side boss section 86 and the fixed side sheave disk 87 are an integrated product or separate products. The driven shaft 73 is fitted into a through-hole of the tubular fixed side boss section 86. In the fixed side boss section 86, relative rotation with respect to the driven shaft 73 and relative movement in the axial direction are both restricted.

The movable sheave 82 is composed of a tubular movable side boss section 88 which is supported by the fixed side boss section 86, and a substantially disk-shaped movable side sheave disk 89 that is provided at the movable side boss section 88. The movable side boss section 88 and the movable side sheave disk 89 are an integral product or separate products. The fixed side boss section 86 is fitted into a through-hole of the tubular movable side boss section 88. Although the movable side boss section 88 is relatively rotatable and displaceable in the axial direction, with respect to the fixed side boss section 86, displacement of the movable side boss section 88 is regulated by the torque cam mechanism 84.

The coil spring 83 is configured by a compression coil spring. A coil center of the coil spring 83 is located concentrically with a rotation center line CL of the driven pulley 74.

Figure 4:
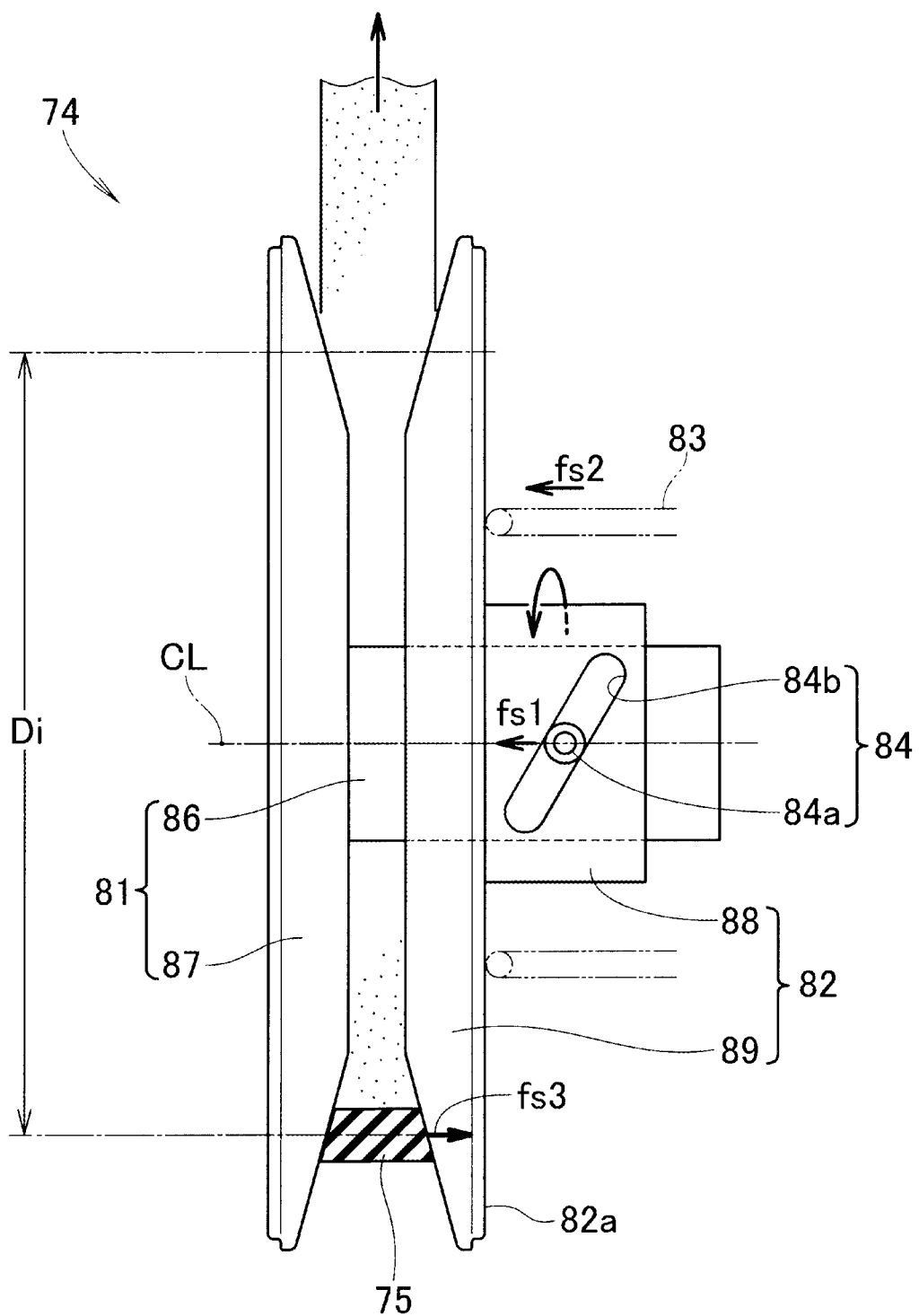
FIG. 4 is a side view of the driven pulley including a torque cam mechanism shown in FIG. 3.

As shown in FIGS. 3 and 4, the torque cam mechanism 84 is composed of one or a plurality of pins 84a that protrude radially outward from the fixed side boss section 86, and one or a plurality of cam grooves 84b which are formed in the movable side boss section 88. The pin 84a is fitted into the cam groove 84b. The cam groove 84b is preferably formed into a long hole shape which penetrates through the movable side boss section 88 in a radial direction, and is inclined in the axial direction of the driven shaft 73 (formed into a spiral shape).

Referring also to FIG. 2, when the engine 13 drives the working unit 14 via the belt-type continuously variable transmission 63, a reaction force corresponding to a magnitude of the load on the working unit 14 acts on the torque cam mechanism 84. Consequently, the cam groove 84b is guided by the pin 84a to slide and displace in the axial direction while rotating. That is, a part of the rotational force which acts on the movable sheave 82 from the engine 13 is converted into a thrust fs1 that presses the side surface of the V-belt 75 by the torque cam mechanism 84. A sum total of the thrust fs1 and an urging force fs2 with which the driven side coil spring 83 urges the movable sheave 82 is Σfs (a total thrust Σfs). The total thrust Σfs and a force fs3 which is to push a belt contact surface of the movable sheave 82 open by the V-belt 75 are balanced, whereby a belt effective diameter Di of the driven pulley 74 is determined. In this way, while Σfs and fs3 are balanced, a speed reduction ratio Ra of the rotational speed Br of the driven pulley 74 to the rotational speed Er of the drive pulley 72, that is, "Ra=Br/Er" is continuously changed automatically.

As shown in FIGS. 2 and 3, the belt-type continuously variable transmission 63 has a speed reduction ratio regulation mechanism 90 that regulates a minimum limit speed reduction ratio in a variable range of the speed reduction ratio Ra, of the rotational speed Br of the driven pulley 74 to the rotational speed Er of the drive pulley 72.

Figure 5:
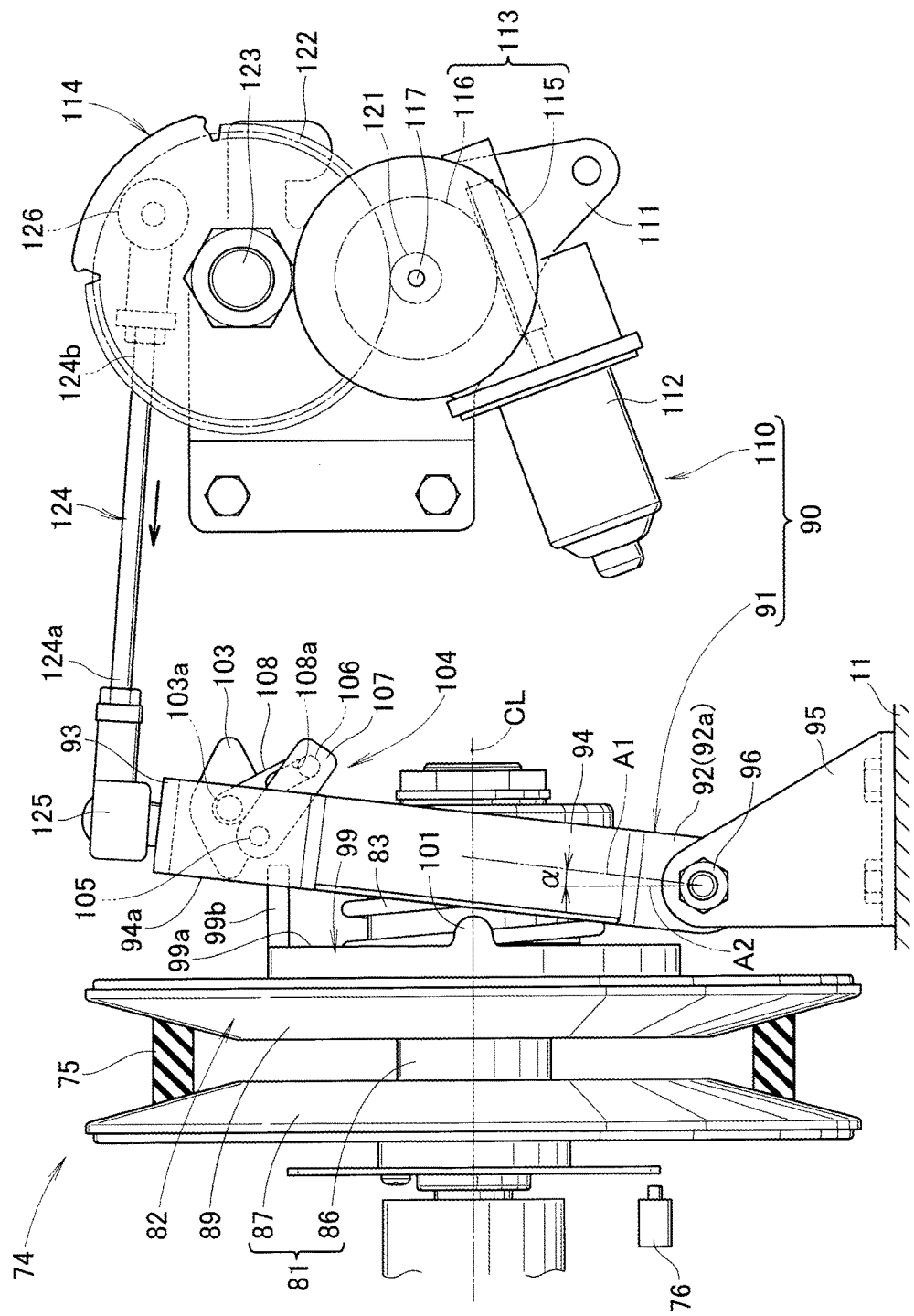
FIG. 5 is an external view of the driven pulley and the speed reduction ratio regulation mechanism shown in FIG. 2.

As shown in FIGS. 3 and 5, the speed reduction ratio regulation mechanism 90 has a swing arm 91 and a regulation drive section 110. The swing arm 91 (the regulation adjustment member 91) is configured to be displaceable so as to adjust an allowable range in which moving away in the axial direction of the movable sheave 82 with respect to the fixed sheave 81 is possible.

The swing arm 91 is located at an opposite side from the fixed sheave 81 with respect to the movable sheave 82. Consequently, the regulation adjustment member 91 can be disposed at the most suitable position for adjusting a range in which maximum move away displacement of the movable sheave 82 with respect to the fixed sheave 81 is possible.

Further, the swing arm 91 is a long and narrow member which is extended in a direction to intersect the rotation center line CL of the driven pulley 74, and is composed of a swing base end portion 92, a swing distal end portion 93 and a pair of swing intermediate portions 94 and 94.

The swing base end portion 92 is one end portion of the swing arm 91, and is supported by a bracket 95 to be swingable in a direction along the rotation center line CL of the driven pulley 74. The bracket 95 is attached to the track frame 11. The swing distal end portion 93 is an end portion at an opposite side from the swing base end portion 92, in the swing arm 91. The pair of swing intermediate portions 94 and 94 are configured between the swing base end portion 92 and the swing distal end portion 93 in the swing arm 91. The pair of swing intermediate portions 94 and 94 are located by being separated at both sides radially outward of the coil spring 83, and are portions that adjust the allowable range in which moving away in the axial direction of the movable sheave 82 with respect to the fixed sheave 81 is possible.

Figure 6:
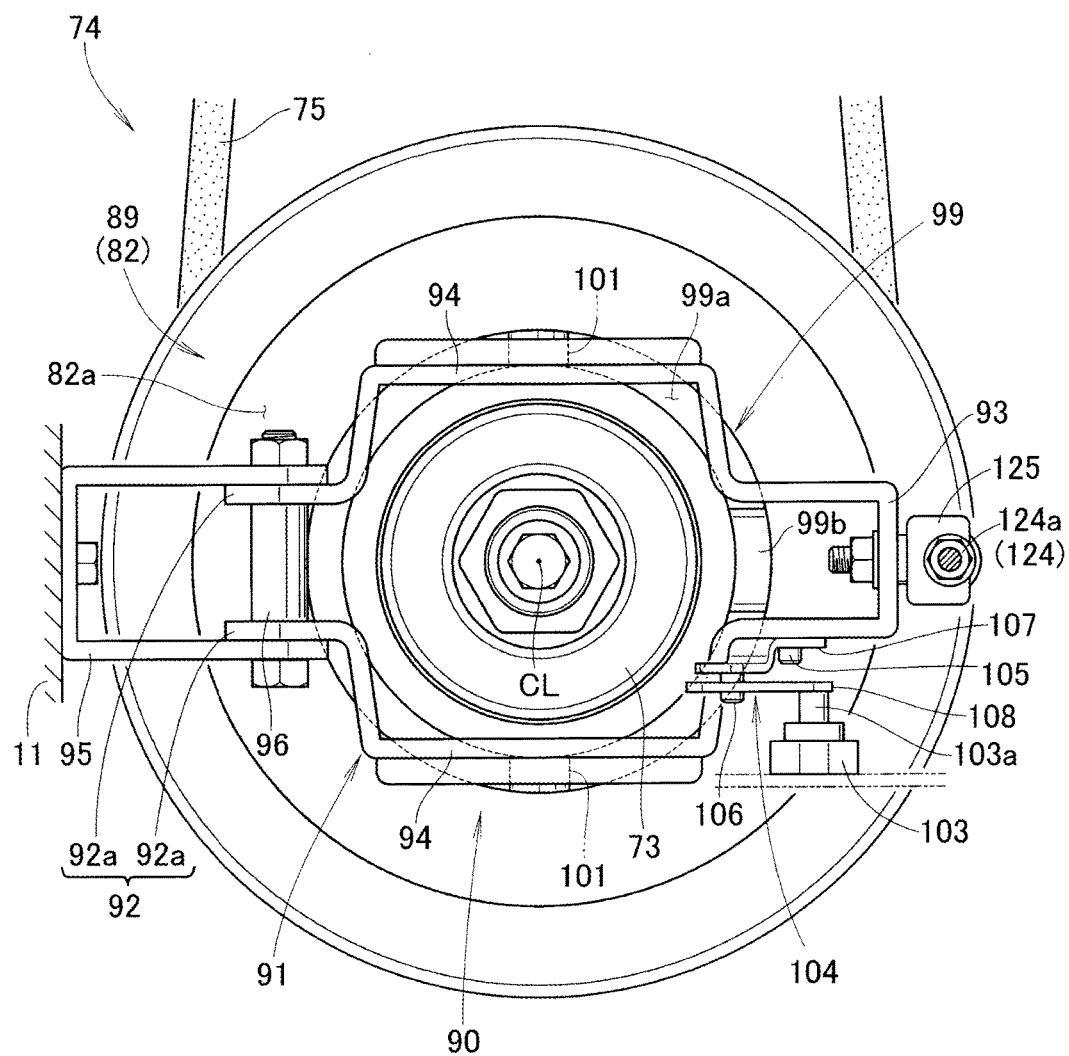
FIG. 6 is a view of the driven pulley and a swing arm shown in FIG. 5, seen from an axial end direction of a driven shaft.
Figure 7:
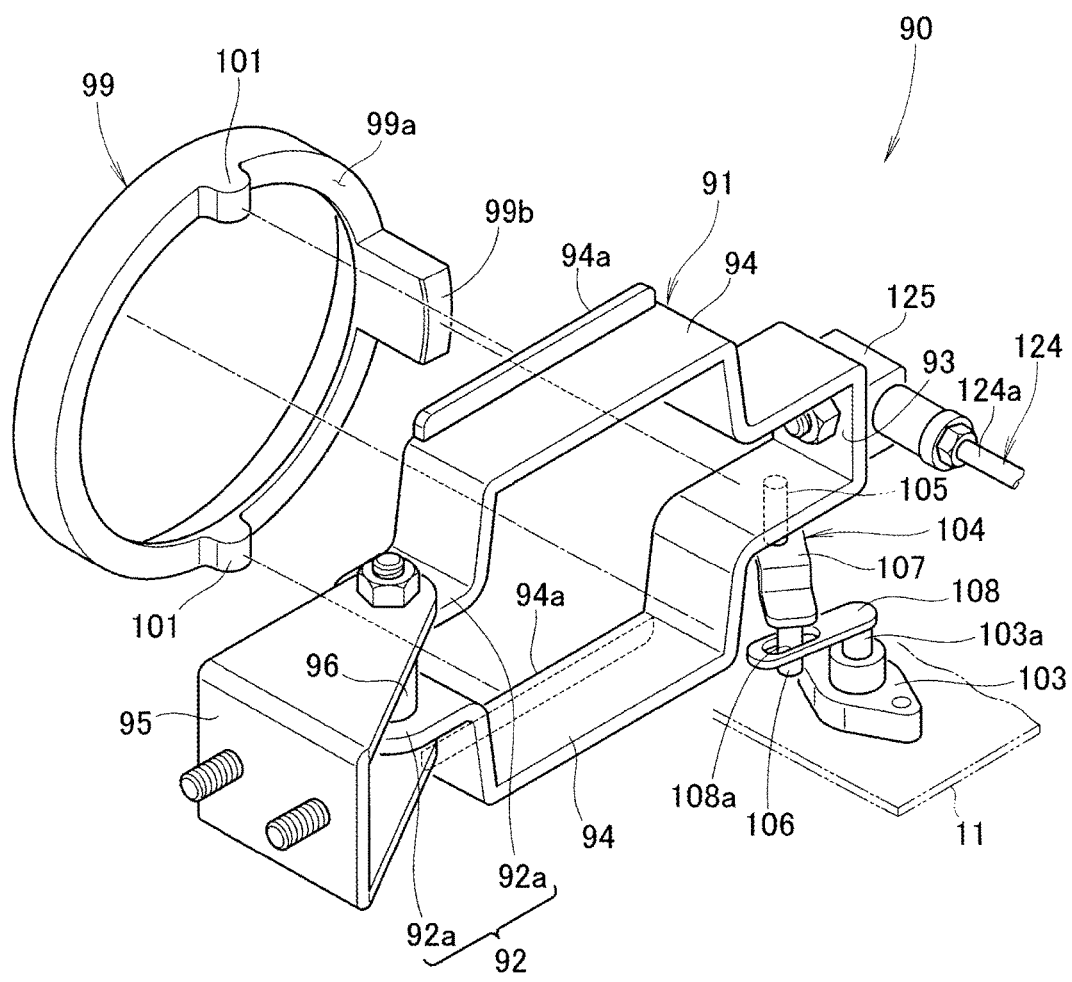
FIG. 7 is an exploded view of the swing arm, a cover, a swing angle detection sensor and a link mechanism shown in FIG. 6.

Describing in more detail, as shown in FIGS. 6 and 7, the swing arm 91 is a fold-formed product of a band plate, and is formed into substantially a U-shape (a fork shape) in which plate surfaces face each other, seen from the axial direction of the driven shaft 73.

The swing base end portion 92 corresponds to a portion of an open end of the U-shape. That is, the swing base end portion 92 is formed by a pair of base end pieces 92a and 92a which are separated from each other, and is swingably supported by the bracket 95 by means of a support shaft 96. The swing distal end portion 93 corresponds to a bottom portion of the U-shape. The pair of swing intermediate portions 94 and 94 correspond to intermediate portions of the U-shape. That is, the pair of swing intermediate portions 94 and 94 spaced from each other, and are located to sandwich the driven side coil spring 83 (refer to FIG. 3) from both sides in the radial direction. A space between the pair of base end pieces 92a and 92a is set to be smaller than a space between the pair of swing intermediate portions 94 and 94.

As shown in FIG. 3, the movable sheave 82 has a roller bearing 97 at a side portion 82a that faces the pair of swing intermediate portions 94 and 94. The roller bearing 97 is formed by a single row ball bearing. An inner ring 97a of the roller bearing 97 is located concentrically with the rotation center line CL of the driven pulley 74, and is provided at the movable sheave 82. More specifically, an annular inner ring support portion 98 is attached to the side portion 82a of the movable sheave 82. An outer circumferential surface of the inner ring support portion 98 is fitted to the inner ring 97a. As a result, the inner ring 97a is supported by the inner ring support portion 98, and is attached to the side portion 82a of the movable sheave 82. An inner diameter of the inner ring support portion 98 is larger than a coil outer diameter of the coil spring 83.

Further, an outer ring 97b of the roller bearing 97 is covered with an annular cover 99 which is rotatable with the outer ring 97b. Referring also to FIGS. 5 to 7, the cover 99 has an anti-rotation bar 99b that is extended toward the swing arm 91 from a side surface 99a at an opposite side to the movable sheave 82. The anti-rotation bar 99b is fitted in between the pair of swing intermediate portions 94 and 94. Consequently, rotation of the cover 99 is regulated by the swing arm 91.

Either one of the side surface 99a of the cover 99, and the side surfaces 94a and 94a of the pair of the swing intermediate portions 94 and 94, which face each other, has or have a pair of protruded portions 101 and 101 that protrude toward the other one. The pair of protruded portions 101 and 101 are formed integrally on the side surface 99a of the cover 99, for example. The pair of protruded portions 101 and 101 are located to be able to press a side surface of the outer ring 97b of the roller bearing 97 via the cover 99 when the pair of swing intermediate portions 94 and 94 displace to the cover 99 side.

Consequently, the pair of swing intermediate portions 94 and 94 indirectly contact the movable sheave 82 which is rotating via the roller bearing 97. Contact resistance of the pair of swing intermediate portions 94 and 94 to the movable sheave 82 which is rotating can be reduced. Moreover, when the pair of swing intermediate portions 94 and 94 are displaced, the protruded portions 101 and 101 press the side surface of the outer ring 97b of the roller bearing 97 via the cover 99. As compared with a case where the displaced pair of swing intermediate portions 94 and 94 press the side surface of the outer ring 97b of the roller bearing 97 via the cover 99, the contact resistance of the pair of swing intermediate portions 94 and 94 to the movable sheave 82 which is rotating can be reduced more.

As shown in FIGS. 5 to 7, the speed reduction ratio regulation mechanism 90 has a swing angle detection sensor 103 that detects a swing angle α (refer to FIG. 5) of the swing arm 91. The swing angle detection sensor 103 is configured by a rotation type potentiometer, and is attached to the track frame 11. A rotating shaft 103a of the swing angle detection sensor 103 is parallel to a support shaft 96 that supports the swing base end portion 92 of the swing arm 91. The swing angle detection sensor 103 is connected to the swing distal end portion 93 in the swing arm 91 or a vicinity of the swing distal end portion 93 by a link mechanism 104. Consequently, the swing angle α of the swing arm 91 can be detected by the swing angle detection sensor 103 via the link mechanism 104.

The link mechanism 104 has a configuration of a V-shaped link seen from an axial direction of the rotating shaft 103a of the swing angle detection sensor 103, and is composed of a first link pin 105, a second link pin 106, a first link bar 107 and a second link bar 108. The first and second link pins 105 and 106 are parallel to the rotating shaft 103a of the swing angle detection sensor 103.

The first link pin 105 is attached to the swing distal end portion 93 or the vicinity of the swing distal end portion 93. In one end portion of the second link bar 108, a slim long hole 108a is formed in a longitudinal direction of the second link bar 108. The first link bar 107 has one end portion attached to the first link pin 105 to be able to swing, and the other end portion connected to the long hole 108a of the second link bar 108 via the second link pin 106 to be relatively rotatable. The other end portion of the second link bar 108 is attached to the rotating shaft 103a of the swing angle detection sensor 103 with relative rotation being regulated.

A swing displacement amount of the swing distal end portion 93 in the swing arm 91 is larger than swing displacement amounts of the other parts 92 and 94. One end portion (the first link pin 105) of the link mechanism 104 is connected to the swing distal end portion 93 having a large swing displacement amount or the vicinity of the swing distal end portion 93. Consequently, the swing angle α of the swing arm 91 can be accurately detected by the swing angle detection sensor 103. Furthermore, the link mechanism 104 is provided in the swing distal end portion 93 which is far from the swing base end portion 92 or the vicinity of the swing distal end portion 93, in the swing arm 91, and therefore, a degree of freedom of disposition of the swing angle detection sensor 103 can be enhanced.

As shown in FIGS. 5 to 7, the aforementioned regulation drive section 110 drives the swing distal end portion 93 of the swing arm 91 to swing continuously, and is attached to the track frame 11 by a bracket 111. The regulation drive section 110 includes an electric motor 112, a worm gear mechanism 113 and a drive force output portion 114. The worm gear mechanism 113 is composed of a worm 115 that is driven by the electric motor 112, and a worm wheel 116 that is meshed with the worm 115. The worm wheel 116 is attached to a first transmission shaft 117. The drive force output portion 114 is driven by the worm wheel 116.

Consequently, the worm gear mechanism 113 can be given a reverse prevention function (self lock) so that the electric motor 112 is not reversed from the swing arm 91 side. Accordingly, the swing arm 91 can be reliably regulated so as not to be displaced by a reaction force in the axial direction of the movable sheave 82.

The drive force output portion 114 includes a pinion 121 at an input side and a gear 122 at an output side. The pinion 121 is attached to the first transmission shaft 117. The gear 122 is attached to a second transmission shaft 123. The swing distal end portion 93 of the swing arm 91 is connected to the drive force output portion 114 by a connecting rod 124. Consequently, the regulation drive section 110 can be disposed in a vacant space in the belt-type continuously variable transmission 63, and therefore, a degree of freedom of disposition can be more enhanced.

In detail, one end portion 124a of the connecting rod 124 is connected to the swing distal end portion 93 by a ball joint 125. The other end portion 124b of the connecting rod 124 is connected to the gear 122 by a ball joint 126. A connection position of the other end 124b of the connecting rod 124 to the gear 122 is offset radially outward from the second transmission shaft 123.

As shown in FIG. 1, the battery 33, the control unit 43 and an operation unit 130 are disposed between the left and right handles 17. The operation unit 130 is composed of an operation box 131 that is provided between the left and right operation handles 17, a left and right turning operation levers 132 that are located in vicinities of the left and right grips 18 and are attached to the left and right operation handles 17, and a travel preparation lever 133 which is located in a vicinity of the left grip 18 and is attached to the left operation handle 17.

As shown in FIG. 2, the operation box 131 includes a main switch 141, a throttle lever 142, a direction speed lever 143, an auger housing posture operation lever 144, a chute operation lever 145, an auger switch 146, a target working speed setting section 147, and a mode changeover switch 148.

The direction speed lever 143 is used to set a traveling direction and a traveling speed of the working machine 10. The auger housing posture operation lever 144 is used to set a posture of the auger housing 51. The chute operation lever 145 is used to set orientations of the chute 55 and the chute guide 57. The auger switch 146 is used to perform on and off operations of the working unit 14. The mode changeover switch 148 is used to switch a control mode of the control unit 43.

The target working speed setting section 147 is an operation member for optionally setting a target working rotational speed of the working unit 14, and is configured by an operation lever. The target working speed setting section 147 can be reciprocated by the hand of the worker, and issues a voltage signal corresponding to a position, that is, a signal of the target working rotational speed by a potentiometer (not illustrated).

The control unit 43 is configured to obtain a minimum limit speed reduction ratio on the basis of a minimum rotational speed of the engine 13 which is set by the throttle lever 142, and the target working rotational speed which is set by the target working speed setting section 147, and control the speed reduction ratio regulation mechanism 90 so as to keep the obtained minimum limit speed reduction ratio. More specifically, the control unit 43 controls the regulation drive section 110 in the speed reduction ratio regulation mechanism 90, that is, the electric motor 112.

Next, operations of the driven pulley 74 and the speed reduction ratio regulation mechanism 90 of the above described configurations will be described. FIG. 5 shows a state in which the movable sheave 82 is not regulated at all by the speed reduction ratio regulation mechanism 90. The swing arm 91 in this state inclines apart from the side surface 99a of the movable sheave 82 to a maximum extent, and stops. An inclination position A1 of the swing arm 91 at this time will be referred to as a "most moved away position A1". The side surfaces 94a and 94a of the pair of swing intermediate portions 94 and 94 are slightly separated from the protruded portions 101. The movable sheave 82 is at a position that is the most moved away with respect to the fixed sheave 81.

Thereafter, the electric motor 112 normally rotates, and thereby causes the connecting rod 124 to advance toward the movable sheave 82 side, via the worm gear mechanism 113 and the drive force output portion 114. The connecting rod 124 which advances causes the swing arm 91 to swing toward the movable sheave 82 side. The result is shown in FIG. 8.

Figure 8:
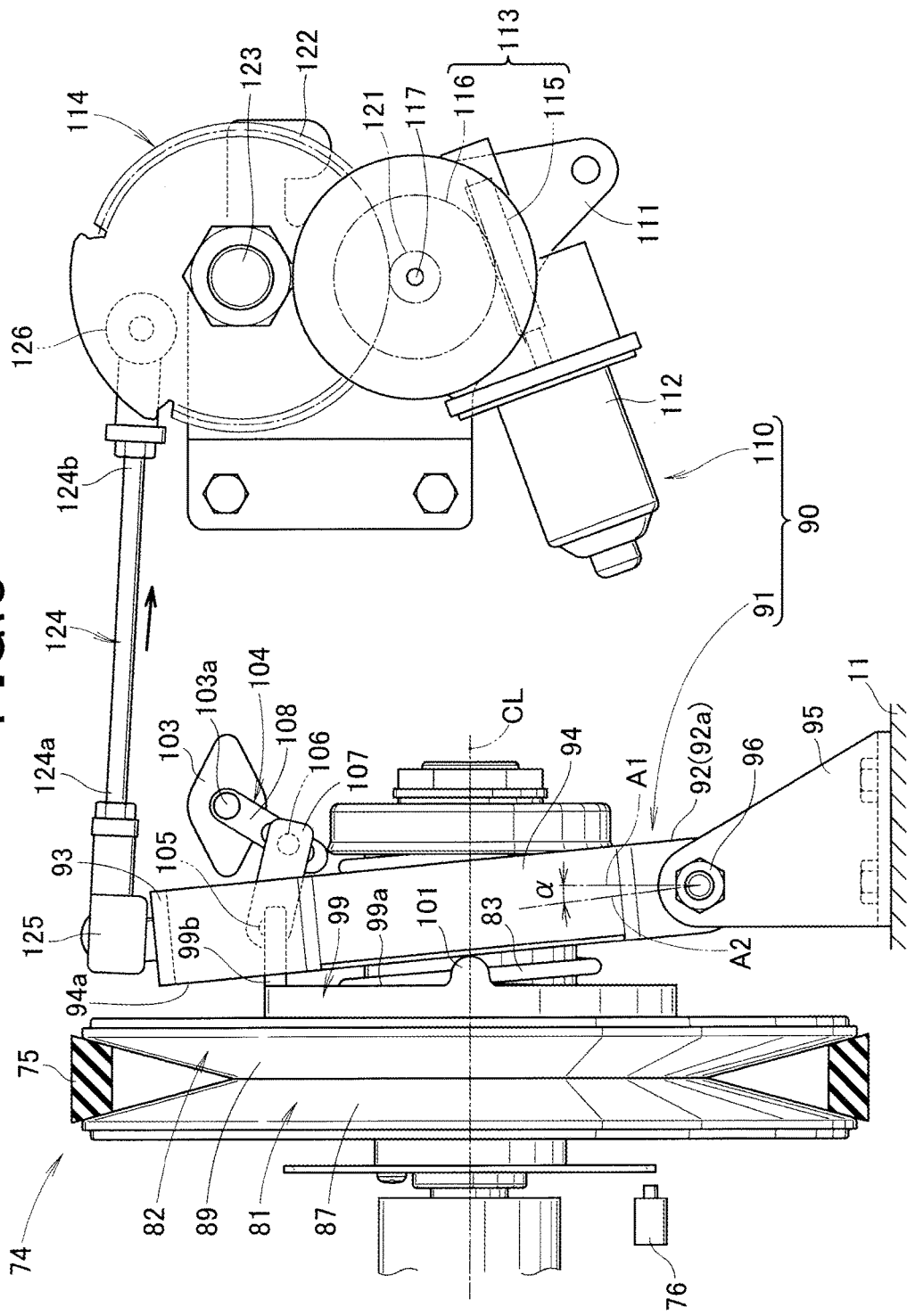
FIG. 8 is an operation diagram of a state in which a movable sheave shown in FIG. 5 is regulated to a maximum extent by the speed reduction ratio regulation mechanism.

FIG. 8 shows a state in which the movable sheave 82 is regulated to a maximum extent by the speed reduction ratio regulation mechanism 90. In this state, the electric motor 112 stops. Consequently, the pair of swing intermediate portions 94 and 94 press the protruded portion 101, and stop. An inclination position A2 of the swing arm 91 at this time is referred to as a "closest position A2". The swing angle α of the swing arm 91 from the most moved away position A1 to the closest position A2 becomes maximum. The movable sheave 82 is located at a position that is the closest to the fixed sheave 81, for example, a position where the sheaves 81 and 82 are in close proximity to or contact each other, for example.

Thereafter, the electric motor 112 reverses, and thereby causes the connecting rod 124 to retreat in a direction to separate from the movable sheave 82 via the worm gear mechanism 113 and the drive force output portion 114. The connecting rod 124 which retreats causes the swing arm 91 to swing in a direction to separate from the movable sheave 82. The result is shown in FIG. 5.

In this manner, the movable sheave 82 is displaceable in only an allowable range (only in a low speed region) from the position which is the closest to the fixed sheave 81 (refer to FIG. 8) to the maximum move away position (refer to FIG. 5) which is regulated by the swing arm 91. That is, by adjusting the swing displacement amount of the swing arm 91, rotation in the high speed region of the driven pulley 74 can be properly regulated. As shown in FIG. 2, the "minimum speed reduction ratio" of the rotational speed Br of the driven pulley 74 to the rotational speed Er of the drive pulley 72 can be regulated by the swing arm 91.

In other words, in only the range of the low speed region of the driven pulley 74, the movable sheave 82 displaces to get close to and move away from the fixed sheave 81, in accordance with increase and decrease of the load of the working unit 14 (refer to FIG. 2). In the aforementioned low speed region, the speed reduction ratio Ra of the rotational speed Br of the driven pulley 74 to the rotational speed Er of the drive pulley 72 can be automatically changed by the operations of the coil spring 83 and the torque cam mechanism 84, in accordance with increase and decrease of the load on the working unit 14. As a result, the rotation in the high speed region of the working unit 14 can be properly regulated in accordance with the working situation of the working machine 10.

When the load on the working unit 14 is abruptly decreased, the movable sheave 82 is to move away temporarily from the fixed sheave 81, by operation of the torque cam mechanism 84. That is, the rotational speed Br of the working unit 14 is to become a high speed temporarily. In relation to this, in the present embodiment, the rotation in the high speed region of the driven pulley 74 can be regulated by the swing arm 91. Consequently, abrupt rotation in the high speed region of the driven pulley 74 can be regulated. Workability of the working machine 10 including the belt-type continuously variable transmission 63 can be enhanced more.

That is, even when the snow removal load on the working unit 14 is abruptly decreased, abrupt rotation in the high speed region of the blower 54 is regulated. Consequently, the snow throwing distance from the chute 55 does not extend abruptly. When a snow throwing place where snow is thrown from the working machine 10 (the auger snowplow 10) is narrow, and when snow removing work is performed in an area dense with housing, the worker does not have to adjust the snow throwing direction and the snow throwing angle of the chute 55 frequently, and snow removing workability is more enhanced.

Summary of the above explanation is as follows. As shown in FIGS. 5 and 6, the swing arm 91 extends in the direction to intersect the rotation center line CL of the driven pulley 74, and is driven to swing by the regulation drive section 110. The pair of swing intermediate portions 94 and 94 are located by being separated at both sides radially outward of the coil spring 83. Consequently, the degree of freedom of disposition of the swing arm 91 and the regulation drive section 110 is enhanced, and a space for disposition of the swing arm 91 can be saved.

Furthermore, the regulation drive section 110 drives the swing distal end portion 93 in the swing arm 91. The distance from the swing base end portion 92 to the swing distal end portion 93 is long with respect to the distance from the swing base end portion 92 to the swing intermediate portions 94 and 94. Consequently, the swing arm 91 can be driven with a relatively small drive force to regulate the maximum move away displacement of the movable sheave 82.

The belt-type continuously variable transmission 63 for a working machine of the present invention is suitable to be loaded on a snowplow and a lawn mower.

REFERENCE SIGNS LIST

10 Working machine (snowplow)
13 Drive source (engine)
14 Working unit
31 Working power transmission system
63 Belt-type continuously variable transmission for working machine
72 Drive pulley
74 Driven pulley
75 V-belt
81 Fixed sheave
82 Movable sheave
82a Side portion of movable sheave
83 Coil spring
84 Torque cam mechanism
90 Speed reduction ratio regulation mechanism
91 Swing arm
92 Swing base end portion
93 Swing distal end portion
94 Swing intermediate portion
94a Side surface of swing intermediate portion
95 Bracket
97 Roller bearing
97a Inner ring
97b Outer ring
99 Cover
99a Side surface of cover
101 Protruded portion
103 Swing angle detection sensor
104 Link mechanism
110 Regulation drive section
112 Electric motor
113 Worm gear mechanism
114 Drive force output portion
115 Worm
116 Worm wheel
124 Connecting rod
Br Rotational speed of driven pulley
CL Rotation center line of driven pulley
Di Belt effective diameter of driven pulley
Er Rotational speed of drive pulley
Ra Speed reduction ratio
α Swing angle of swing arm

What is claimed is:

1. A belt-type continuously variable transmission for a working machine that is capable of continuously changing a speed reduction ratio of a driven pulley to a drive pulley,
in which the driven pulley includes a fixed sheave, a movable sheave displaceable in an axial direction with respect to the fixed sheave, a coil spring that urges the movable sheave toward the fixed sheave, and a torque cam mechanism that converts a part of a rotational force that acts on the movable sheave into a thrust that presses a side surface of a V-belt, comprising:
a speed reduction ratio regulation mechanism that regulates a minimum speed reduction ratio of a rotational speed of the driven pulley to the drive pulley,
wherein the speed reduction ratio regulation mechanism has a swing arm that adjusts an allowable range in which moving away in the axial direction of the movable sheave with respect to the fixed sheave is possible, and a regulation drive section that drives a swing distal end portion of the swing arm to swing continuously, the swing arm extends in a direction to intersect a rotation center line of the driven pulley, a swing base end portion of the swing arm is supported by a bracket to be swingable in a direction along the rotation center line of the driven pulley, a region between the swing base end portion and the swing distal end portion in the swing arm is configured to be a pair of swing intermediate portions, and the pair of swing intermediate portions are located by being separated at both sides radially outward of the coil spring so as to sandwich the coil spring from both sides in a radial direction, and are portions that adjust the allowable range in which moving away in the axial direction of the movable sheave with respect to the fixed sheave is possible.

2. The belt-type continuously variable transmission for a working machine according to claim 1,
wherein the swing arm is located at an opposite side from the fixed sheave with respect to the movable sheave.

3. The belt-type continuously variable transmission for a working machine according to claim 1,
wherein the regulation drive section includes an electric motor, a worm gear mechanism in which a worm is driven by the electric motor, and a drive force output portion that is driven by a worm wheel of the worm gear mechanism, and the swing distal end portion is connected to the drive force output portion by a connecting rod.

4. The belt-type continuously variable transmission for a working machine according to claim 1, further comprising:
a swing angle detection sensor that detects a swing angle of the swing arm,
wherein the swing angle detection sensor is connected to the swing distal end portion in the swing arm or a vicinity of the swing distal end portion, by a link mechanism.

5. The belt-type continuously variable transmission for a working machine according to claim 1, further comprising:
a roller bearing, in a side portion that faces the pair of swing intermediate portions in the movable sheave,
wherein an inner ring of the roller bearing is located concentrically with the rotation center line of the driven pulley, and is provided in the movable sheave,
an outer ring of the roller bearing is covered with an annular cover rotatable with the outer ring,
either one of a side surface of the cover and side surfaces of the pair of swing intermediate portions, which face each other, has a protruded portion that is protruded toward the other one, and
the protruded portion is located to be able to press a side surface of the outer ring of the roller bearing via the cover when the pair of swing intermediate portions are displaced.

6. The belt-type continuously variable transmission for a working machine according to claim 1, which is provided in a working power transmission system from a drive source to a working unit of the working machine.

7. A belt-type continuously variable transmission for a working machine that is capable of continuously changing a speed reduction ratio of a driven pulley to a drive pulley,
in which the driven pulley includes a fixed sheave, a movable sheave displaceable in an axial direction with respect to the fixed sheave, a coil spring that urges the movable sheave toward the fixed sheave, and a torque cam mechanism that converts a part of a rotational force that acts on the movable sheave into a thrust that presses a side surface of a V-belt, comprising:
a speed reduction ratio regulation mechanism that regulates a minimum speed reduction ratio of a rotational speed of the driven pulley to the drive pulley,
wherein the speed reduction ratio regulation mechanism has a swing arm that adjusts an allowable range in which moving away in the axial direction of the movable sheave with respect to the fixed sheave is possible, and a regulation drive section that drives a swing distal end portion of the swing arm to swing continuously,
the swing arm extends in a direction to intersect a rotation center line of the driven pulley,
a swing base end portion of the swing arm is supported by a bracket to be swingable in a direction along the rotation center line of the driven pulley,
a region between the swing base end portion and the swing distal end portion in the swing arm is configured to be a pair of swing intermediate portions, and
the pair of swing intermediate portions are located by being separated at both sides radially outward of the coil spring, and are portions that adjust the allowable range in which moving away in the axial direction of the movable sheave with respect to the fixed sheave is possible,
a swing angle detection sensor that detects a swing angle of the swing arm,
wherein the swing angle detection sensor is connected to the swing distal end portion in the swing arm or a vicinity of the swing distal end portion, by a link mechanism including a first link bar and a second link, the first link pivotally connected to the swing distal end portion of the swing arm and the second link bar, the second link connected to the swing angle detection sensor.

8. The belt-type continuously variable transmission for a working machine according to claim 7,
wherein the regulation drive section includes an electric motor, a worm gear mechanism in which a worm is driven by the electric motor, and a drive force output portion that is driven by a worm wheel of the worm gear mechanism, and
the swing distal end portion is connected to the drive force output portion by a connecting rod.

9. The belt-type continuously variable transmission for a working machine according to claim 7, further comprising:
a roller bearing, in a side portion that faces the pair of swing intermediate portions in the movable sheave,
wherein an inner ring of the roller bearing is located concentrically with the rotation center line of the driven pulley, and is provided in the movable sheave,
an outer ring of the roller bearing is covered with an annular cover rotatable with the outer ring,
either one of a side surface of the cover and side surfaces of the pair of swing intermediate portions, which face each other, has a protruded portion that is protruded toward the other one, and
the protruded portion is located to be able to press a side surface of the outer ring of the roller bearing via the cover when the pair of swing intermediate portions are displaced.

10. A belt-type continuously variable transmission for a working machine that is capable of continuously changing a speed reduction ratio of a driven pulley to a drive pulley,
in which the driven pulley includes a fixed sheave, a movable sheave displaceable in an axial direction with respect to the fixed sheave, a coil spring that urges the movable sheave toward the fixed sheave, and a torque cam mechanism that converts a part of a rotational force that acts on the movable sheave into a thrust that presses a side surface of a V-belt, comprising:

a speed reduction ratio regulation mechanism that regulates a minimum speed reduction ratio of a rotational speed of the driven pulley to the drive pulley, wherein the speed reduction ratio regulation mechanism has a swing arm that adjusts an allowable range in which moving away in the axial direction of the movable sheave with respect to the fixed sheave is possible, and a regulation drive section that drives a swing distal end portion of the swing arm to swing continuously, the swing arm extends in a direction to intersect a rotation center line of the driven pulley, a swing base end portion of the swing arm is supported by a bracket to be swingable in a direction along the rotation center line of the driven pulley, a region between the swing base end portion and the swing distal end portion in the swing arm is configured to be a pair of swing intermediate portions, and the pair of swing intermediate portions are located by being separated at both sides radially outward of the coil spring, and are portions that adjust the allowable range in which moving away in the axial direction of the movable sheave with respect to the fixed sheave is possible, further comprising:

a roller bearing, in a side portion that faces the pair of swing intermediate portions in the movable sheave, wherein an inner ring of the roller bearing is located concentrically with the rotation center line of the driven pulley, and is provided in the movable sheave, an outer ring of the roller bearing is covered with an annular cover rotatable with the outer ring, either one of a side surface of the cover and side surfaces of the pair of swing intermediate portions, which face each other, has a protruded portion that is protruded toward the other one, the protruded portion is located to be able to press a side surface of the outer ring of the roller bearing via the cover when the pair of swing intermediate portions are displaced, and the cover includes an anti-rotation bar that is extended toward the swing arm from the side surface of the cover, the anti-rotation bar is fitted in between the pair of swing intermediate portions so that rotation of the cover is regulated by the swing arm.

11. The belt-type continuously variable transmission for a working machine according to claim 10, wherein the regulation drive section includes an electric motor, a worm gear mechanism in which a worm is driven by the electric motor, and a drive force output portion that is driven by a worm wheel of the worm gear mechanism, and the swing distal end portion is connected to the drive force output portion by a connecting rod.

12. The belt-type continuously variable transmission for a working machine according to claim 10, further comprising:

a swing angle detection sensor that detects a swing angle of the swing arm, wherein the swing angle detection sensor is connected to the swing distal end portion in the swing arm or a vicinity of the swing distal end portion, by a link mechanism.

\* \* \* \* \*